Patented Oct. 6, 1936

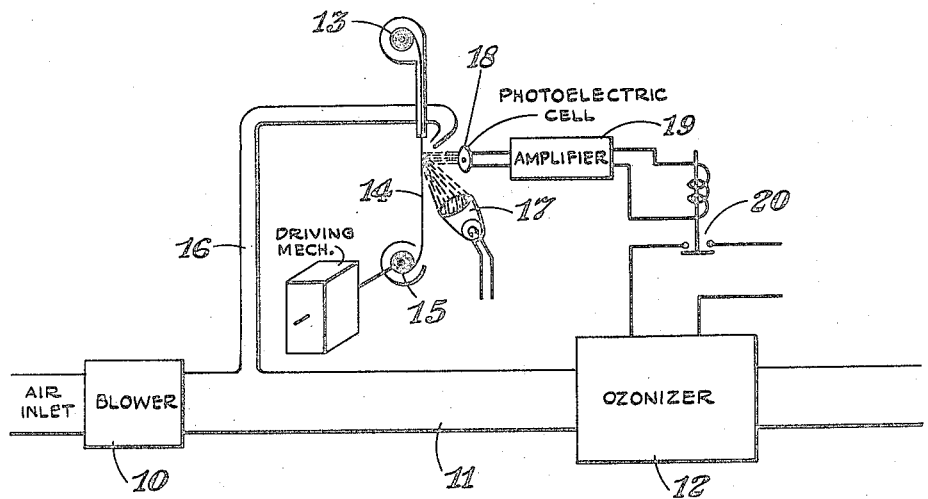
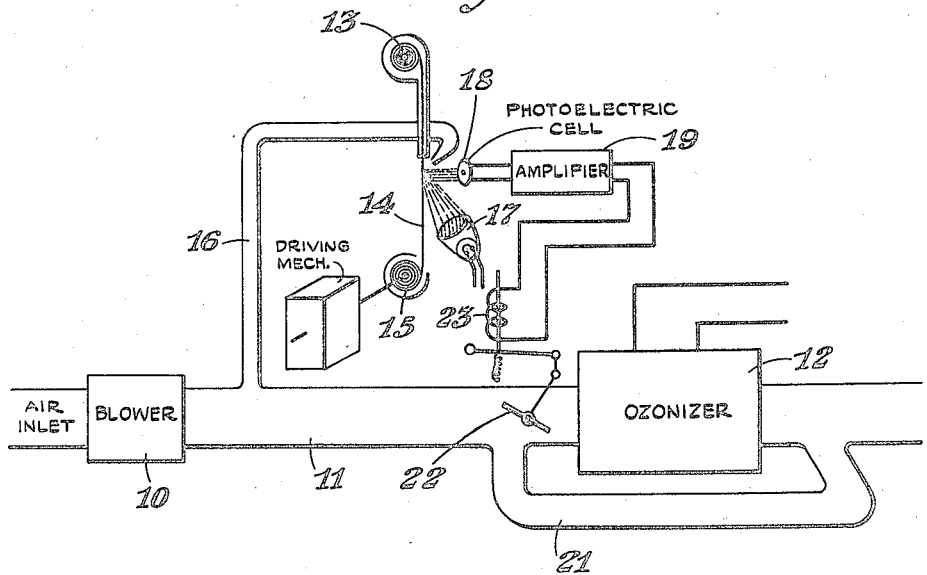

2,056,663

UNITED STATES PATENT OFFICE 2,056,663

METHOD OF AND APPARATUS FOR CONDITIONING AIR

Ted E. Foulke, Nutley, N. J., assignor to General Electric Vapor Lamp Company, Hoboken, N. J., a corporation of New Jersey Original application February 7, 1933, Serial No. 655,653. Divided and this application March 13, 1935, Serial No. 10,786

3 Claims. (Cl. 98—1)

The present invention relates to the art of conditioning air with ozone, and more particularly relates to a method and apparatus for the regulation of the ozone concentration.

The invention consists in a new and novel method and combination of elements, as hereinafter set forth and claimed.

A particular object of my invention is to provide a novel method of controlling the ozone concentration in conditioned air. Another object of my invention is to provide a novel means to control the amount of ozonization of the air. Still another object of my invention is to provide a novel method of operating an ozone generating apparatus. Still other objects and advantages of my invention will appear from the following detailed specification or from an inspection of the accompanying drawing.

It is well known that the conversion of oxygen to ozone can be readily produced by means of a corona or silent electric discharge, and various devices have been utilized to produce this result, a particularly desirable apparatus being shown in my co-pending application, Serial No. 655,653, filed February 7, 1933, of which this case is a division. These devices are frequently used to freshen and purify the air in a room, either alone or in combination with humidifying and other conditioning means.

In some cases, as where such an ozonizer is used in relatively small rooms, the ozone produced occasionally becomes too concentrated for comfort, especially under certain atmospheric conditions. In such a case some means of controlling the amount of ozone produced is obviously necessary. I have now discovered a novel apparatus and a novel method of operation, whereby the ozone concentration is continuously maintained at any desired value under any circumstances. According to this novel method the air in the room is continuously tested, and the operation of the ozonizer is determined by or based upon the results of this test.

For the purpose of illustrating my invention I have shown several embodiments thereof in the accompanying drawing, in which Fig. 1 is schematic diagram showing my novel arrangement of apparatus for maintaining a predetermined ozone concentration in the air of a room or building, and Fig. 2 is a schematic diagram showing a modification of the apparatus of Fig. 1.

Wherever ozonizers have been used to condition air it has been found that the concentration of ozone may become unpleasant after long continued operation, and that this condition may exist even though the voltage of the silent discharge is decreased as much as possible, for the ozone production varies but little with changes in the applied voltage, within the range of variation which is possible. The apparatus schematically shown in Fig. 1 overcomes this difficulty by automatically shutting down the ozonizer whenever the ozone concentration reaches a predetermined value. The air conditioning apparatus schematically illustrated has a blower or fan 10 which takes air from the room or other enclosed space whose air is to be conditioned and passes it through a pipe 11 to the ozonizer 12, after which it is again returned to the room. Said ozonizer 12 preferably comprises apparatus of the silent discharge type, such as disclosed in my co-pending application to which reference has been made hereinbefore. A suitable container 13 contains a reel of paper ribbon 14, while a reel 15 which is continuously or intermittently driven by any suitable driving mechanism has one end of said ribbon 14 attached thereto, and slowly pulls said ribbon out of said container 13. A small tube 16 leads from the pipe 11 to a point adjacent to the ribbon 14 near where the latter emerges from said container 13, and continuously directs a stream of air on said ribbon 14. Said ribbon is coated with any substance or substances which will indicate by a change of color or shade the presence of ozone in this air. For example, I prefer to use a coating comprising a mixture of potassium iodide and starch, this mixture turning from white to blue in the pressence of ozone. A suitable light source 17 directs a beam of light onto this ribbon 14 at or just below the point at which the air stream impinges thereon. A photo-electric cell 18 which is so placed as to receive the light reflected from said ribbon is connected through an amplifier 19 to the magnet coil of a relay 20. The contacts of said relay are connected in the energizing circuit of the ozonizer 12, said contacts being biased to the open circuit position.

In the use and operation of the apparatus shown in Fig. 1 a sample of the incoming air, which is typical of the air in the room, is directed in a continuous stream upon the coated ribbon 14. If there is no ozone in this air the coating will be unchanged and the light reflected from said ribbon to the photo-electric cell 18 will be a maximum. Sufficient current will thereupon flow through the coil of the relay 20 to keep the contacts thereof closed, with the result that the ozonizer 12 is continuously operated to increase the ozone concentration of the air in the room. As the ozone concentration in the room is thus increased the ozone content of the air which is borne against the ribbon 14 increases in like proportion. This ozone causes the starch-iodide coating on said ribbon to turn blue, the depth of the color depending upon the ozone concentration. As the color of the coating thus changes the light which is reflected therefrom to the photoelectric cell 18 is reduced, causing a reduction in the current which flows through the coil of the relay 20, until at some predetermined value the contacts of said relay are allowed to open, thus shutting down the ozonizer 12. Due to the movement of the ribbon 14 a fresh portion thereof is then brought into the path of the air from the tube 16 and likewise into the field of the photoelectric cell 18. Hence as the ozone concentration decreases the coating on the fresh portions of said ribbon will be gradually turned less blue, and more and more light is thus received by the photoelectric cell 18. When the ozone content has decreased to a predetermined value the contacts of the relay 20 will again be closed, restarting the operation of the ozonizer 12. Said ozonizer is thus intermittently operated for periods sufficient to maintain the ozone concentration substantially constant at a desired value. This concentration may be varied at will, however, by varying the gain in the amplifier 19, or by varying the resistance in the circuit of the photoelectric cell 18, as well as in various other ways. Where the photoelectric cell 18 has a relatively low response to blue light as compared to light of longer wave lengths the sensitivity of the apparatus may be greatly increased. Several cells having such a characteristic are now available on the market. Where the response of these cells is sufficient the amplifier may, of course, be omitted. It is to be noted that with the arrangement of apparatus shown in this figure any failure of a unit such as the photoelectric cell, the light source, the ribbon driving mechanism, or the amplifier will automatically shut down the ozonizer, so that the ozone concentration can never become too great, despite any such mishap.

The apparatus shown in Fig. 2 is much the same as that shown in Fig. 1. In this case, however, a by-pass 21 is connected around the ozonizer 12, and a damper 22 is placed in the pipe 11 between said by-pass and said ozonizer. Said by-pass is preferably so designed as to offer an appreciable resistance to the flow of air therethrough, including means to increase the back pressure therein whenever there is any appreciable air flow through said ozonizer 12, in order to normally force a large proportion of the air through said ozonizer without the use of an additional damper in said by-pass. Said damper 22 is biased to the closed position, but is adapted to be opened by the magnetic solenoid 23 which is actuated by the output of the photoelectric cell 18, amplified if necessary.

With this novel arangement, assuming that there is no ozone in the incoming air, the coating of the ribbon 14 will be unchanged, and a maximum of light will be received by the photoelectric cell 18. The current from said cell will thereupon energize the solenoid 23 and fully open the damper 22, with the result that the maximum proportion of air will be passed through the ozonizer 12. The ozone concentration of the air in the room is thereby rapidly increased. This increase in ozone concentration is reflected in an increasing change in the color of the coating on the ribbon 14, with a corresponding decrease in the amount of light reflected to the photoelectric cell 18. The current from said cell thereupon gradually decreases, with the result that the damper 22 is gradually allowed to close, diverting more and more air from the ozonizer 12. Since the ozone output from said ozonizer is substantially proportional to the volume of air passing therethrough (assuming that it is operating at high efficiency at maximum flow) a constantly decreasing amount of ozone is added to the air. At a predetermined ozone concentration a state of equilibrium is attained, exactly enough ozone being added at all times to just maintain the desired concentration. As in the apparatus of the previous figure, any failure of a unit in the ozone measuring unit results in the automatic closing of the damper 22, so that an excess of ozone will never be produced.

While I have described my invention by reference to a specific embodiment, it is to be understood that my invention is not limited thereto, but that various changes, substitutions, or omissions, within the scope of the appended claims, may be made in the method and in the apparatus shown and described without departing from the spirit of my invention.

I claim as my invention:—

1. In an air conditioning apparatus, in combination, an ozonizer, a movable element whose position controls the rate of production of ozone by said ozonizer, means to determine the ozone concentration in the air and to vary the position of said movable element in accordance with said concentration whereby said ozone concentration is maintained at a predetermined value.

2. In an air conditioning apparatus, in combination, an ozonizer, an air duct leading thereto, a by-pass about said ozonizer, a damper whose position controls the proportion of the air from said duct which traverses said ozonizer, means to determine the ozone concentration in the air and to vary the position of said damper in accordance therewith.

3. In an air conditioning apparatus, in combination, an ozonizer, an air duct leading thereto, a by-pass about said ozonizer, means comprising a damper to vary the proportion of the air from said duct which flows through said ozonizer, means including a photoelectric cell to vary a current in accordance with the ozone concentration in said duct, and means responsive to said current to move said damper to decrease the proportion of the air flowing through said ozonizer as said ozone concentration increases.

TED E. FOULKE.